United States Patent [19]

Crispell

[11] Patent Number: 4,764,068

[45] Date of Patent: Aug. 16, 1988

[54] KNURLED CUP-POINT SET SCREW

[75] Inventor: Corey Crispell, Warminster, Pa.

[73] Assignee: SPS Technologies, Inc., Newtown, Pa.

[21] Appl. No.: 22,667

[22] Filed: Mar. 6, 1987

[51] Int. Cl.$^4$ .............................................. F16B 35/00
[52] U.S. Cl. .................................... 411/393; 411/959
[58] Field of Search ............... 411/168, 178, 310, 311, 411/393, 386, 959; 403/362

[56] References Cited

U.S. PATENT DOCUMENTS

| 2,295,314 | 9/1942 | Whitney | 411/393 |
| 2,314,274 | 3/1943 | Hallowell | 411/168 |
| 2,778,265 | 1/1957 | Brown | 411/393 |
| 2,992,669 | 7/1961 | Fesmire | 411/168 |

Primary Examiner—Neill R. Wilson
Attorney, Agent, or Firm—Aaron Nerenberg; James D. Dee

[57] ABSTRACT

A set screw having a novel cup-point for engagement with a shaft or rod. The cup-point has knurling on a portion of its outer circumferential surface and is provided with a smooth frustoconical surface portion adjacent the knurling such that, in use, the smooth surface portion of the cup-point engages the surface of the rod or shaft before the knurling.

6 Claims, 2 Drawing Sheets 4,764,068

KNURLED CUP-POINT SET SCREW

BACKGROUND OF THE INVENTION

The present invention relates to set screws and more particularly to improved vibration resistant set screws.

Set screws are used in various applications to removably secure fly wheels, pinions, pulleys, cams, propellers and the like to shafts. In such applications, the set screws experience both vibrations and shock loads which might tend to loosen them.

Many set screw points have been designed in the past to increase the ability of the set screw to resist vibration. Such solutions often include the provision of teeth at the point, as taught, for example, by U.S. Pat. Nos. 2,462,910 (issued Mar. 1, 1949 to L. E. Simmons); 2,245,525 (issued June 10, 1941 to R. W. Dicely); 3,419,058 (issued Dec. 31, 1968 to R. A. Walker); and 1,330,792 (issued Feb. 17, 1970 to H. H. Frick).

An alternative point configuration combining a counterbored point with an external knurl is disclosed in U.S. Pat. No. 2,992,669 (issued July 18, 1961 to H. R. Fesmire).

While these set screws have increased vibration resistance as compared with a plain point, they do not have sufficient resistance for all uses. What is needed, therefore, is a point design for a set screw having increased vibration resistance over these prior designs.

SUMMARY OF THE PRESENT INVENTION

The present invention provides a set screw having a novel cup point configuration having increased vibration resistance.

The set screw has a threaded shank and a cup-point formed at one end of the shank. The cup-point has an outer frustoconical surface and an inner cylindrical surface which together define an annular wedge terminating in a circular edge. A portion of the outer frustoconical surface remote from the circular edge is provided with knurling. In use, the set screw is tightened against a work, such as a shaft or rod, and the circular edge bites into the material. Upon further tightening, the knurling engages the work.

It is therefore the primary object of the present invention to provide a set screw having improved resistance to vibration.

This and many other objects features and advantages of the present invention will become apparent to those skilled in the art when the following exemplary detailed description of the present invention is read in conjunction with the drawings appended hereto.

BRIEF DESCRIPTION OF THE DRAWINGS

In the drawings, wherein like reference numerals refer to like elements throughout.

DETAILED DESCRIPTION OF THE PREFERRED EMBODIMENTS

Figure 3:
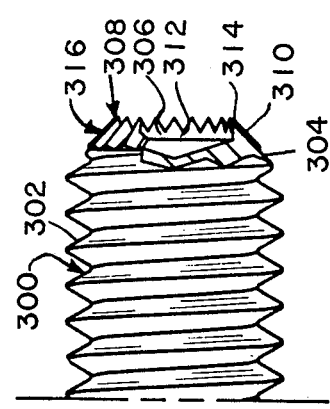
FIG. 3 shows a partly cutaway side elevational view of the point of a conventional prior art counterbored knurled cup-point set screw.
Figure 4:
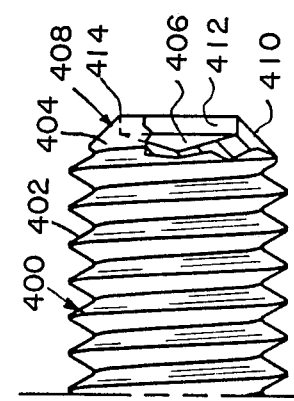
FIG. 4 depicts a partly cutaway side elevational view of the point of a prior art counterbored plain cup-point set screw.
Figure 5:
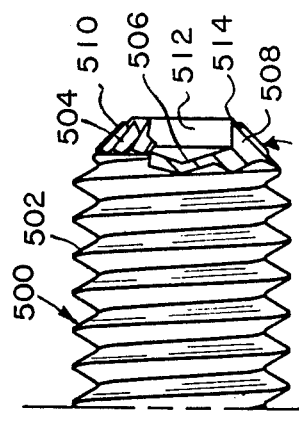
FIG. 5. illustrates a partly cutaway side elevational view of the point of a counterbored knurled cup-point set screw according to the present invention.
Figure 7:
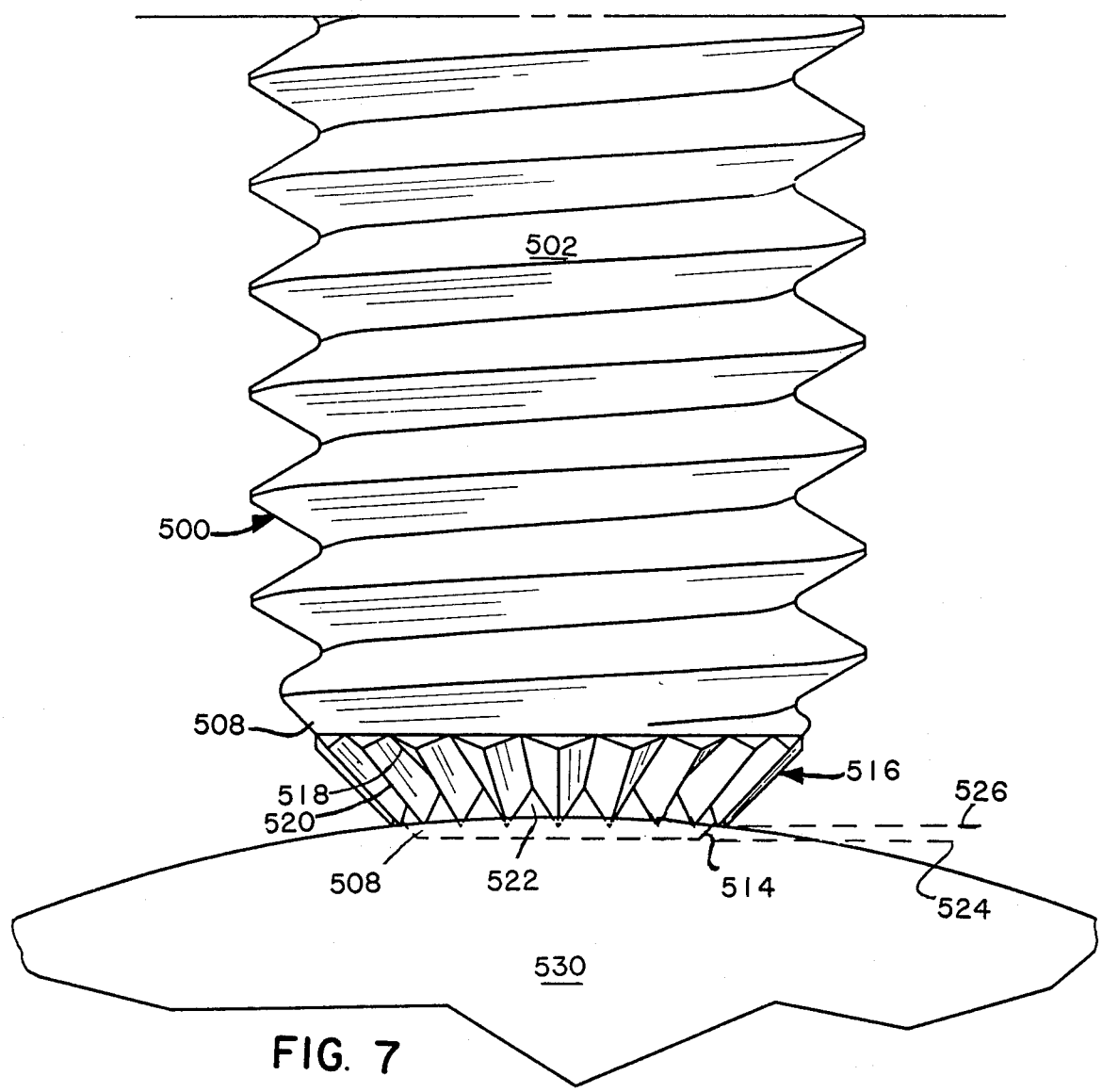
FIG. 7 is a diagramatic elevational view showing the relationship between the point at a cup-point set screw and the peripheral surface of a cylindrical shaft or rod.
Figure 6:
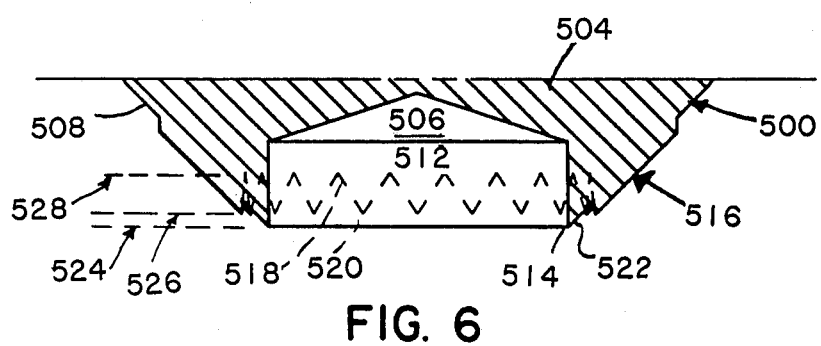
FIG. 6 is an enlarged fragementary sectional view of the set screw point of FIG. 5.

Referring now to the drawing, and more particularly, to FIGS. 1-4 thereof, prior art set screws 100, 200, 300 and 400, respectively, are illustrated for comparison with the novel set screw 500 of the present invention, shown in FIGS. 5 through 7.

Figure 1:
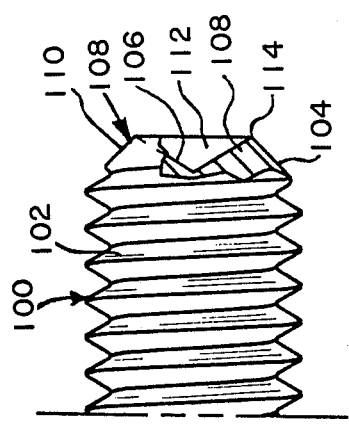
FIG. 1 depicts a partly cutaway side elevational view of the point or working end of a conventional prior art plain cup-point set screw.

FIG. 1 shows a conventional cup-point set screw 100 having a threaded shank 102 and a point 104 formed at one end of the shank. The point 104 is designed to bite into the material of the work, such as a shaft or rod (not illustrated) in a manner well known in the art, against which it is tightened. The point 104 resists the loosening effects of vibration, and anchors the set screw 100 to the work. The point 104 is cupped by the provision of a cavity 106 forming an annular wedge 108 having a frustoconical outer surface 110, an inner surface 112 and an edge 114. The cupped point 104 thereby presents the edge 114 of the wedge 108 to the surface of the work to cause it to displace surface material of work when the set screw 100 is used.

Figure 2:
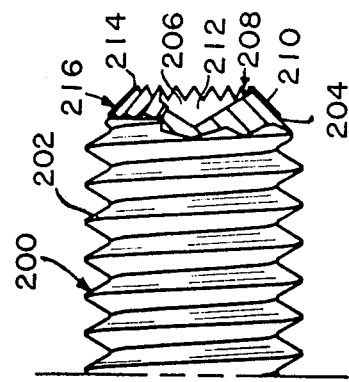
FIG. 2 illustrates a partly cutaway side elevational view of the point of a conventional prior art knurled cup point set screw.

FIGS. 2 through 4 show a conventional knurled cup-point set screw 200, a conventional knurled counterbored set screw 300, and a prior art plain cup-point counterbored set screw 400 having, respectively, threaded shanks 202, 302 and 402, points 204, 304 and 404, and cavities 206, 306 and 406 forming, respectively, wedges 208, 308 and 408 having outer surfaces 210, 310 and 410, inner surfaces 212, 312 and 412, and edges 214, 314 and 414.

Set screws 200, and 300 differ from set screws 100 and 400 in the provision of knurling 216 and 316 on their respective outer surfaces 210 and 310; resulting in jagged edges 214 and 314 for engagement with the work. The set screws 300 and 400 differs from set screws 100 and 200 in the provision of a counterbore in the cavities 306 and 406, respectively, such that the respective inner surfaces 312 and 412 of the set screws 300 and 400 are cylindrical in shape.

As taught by Fesmire, cited above, the plain cupped point 104 and the knurled cup-point 204 described above have limited work-penetrating potential, both theoretically and in practice, because the sloping inner surfaces 112 and 212 will cause undesirable compressive stresses which increase geometrically as penetration advances.

The knurling 216 on the set screw 200 improves the penetration of the edge 214 into the work, as compared to the plain edge 114 of the plain cup point set screw 100, due to a slight reaming actions of the knurling. However, the compressive stress described above still limits the penetration of the point. The increased holding power of the knurled cup point set screw 200 over the plain cup point set screw 100 is primarily due to the elasticity of the work material, which tends to spring into the spaces between the knurls to mechanically interlock the point 204 with the work.

The counterbored knurled cup point set screw 300 was proposed by Fesmire to increase the work penetrating potential of the point by reducing the compressive forces associated with a sloping inner wall and by allowing the knurling to penetrate deeper into the workpiece. The increased penetration resulted in greater vibration resistance both in theory and in practice.

The counterbored plain cup point set screw 400 was briefly mentioned by Fesmire as an alternative design with the suggestion that it was an improvement over a plain cup point design, but with the implication that the counterbored knurled cup point was superior to a counterbored plain cup. The inventor of the present invention discovered that there were advantages to each of the set screws 300 and 400 which advantages were apparently unrecognized previously.

The inventor confirmed that as predicted, addition of either knurling, as in set screw 200, or a counterbore as in set screw 400, improved the vibration resistance of a set screw over that provided by a plain-cup standard bore set screw 100. Furthermore, the addition of the counterbore to a knurled point set screw increased the vibration resistance of the set screw, as compared to a knurled standard bore set screw. The counterbore in the knurled cup point socket set screws showed deeper penetration into mating material than regular knurled cup points, and it develops a vise-like grip on the metal pushed up into the cup. So powerful is this grip that significant tensile force is required to pull a seated screw loose from mating material. The superior vibrational holding power of the counterbored knurled cup point set screw appears to result from the point gripping power and the resistance to rotation of the external knurl.

However, unexpectedly, the inventor of the present invention discovered that the counterbored plain cup-point set screw 400 has the greatest vibration resistance of these four designs, at least within the range of frequencies tested. The plain cup-point apparently offers less resistance to tightening and permits higher preloads, while the knurling cuts into the surface of the work.

The set screw 500 of the present invention, illustrated in FIGS. 5 through 7, combines the advantages of the set screws 300 and 400 described above to provide a novel design providing even greater vibration resistance than any of the prior art set screws 100, 200, 300 and 400.

As shown in FIG. 5, the knurled counterbored cup-point set screw 500 of the present invention has a threaded shank 502 terminating in a point 504. The point 504 has a counterbored cavity 506 forming a wedge 508 having a frustoconical outer surface 510, a cylindrical inner surface 512 and a circular edge 514. As shown in FIG. 6, a portion of the frustoconical surface 510 remote from the circular edge 514 is provided with knurling 516 having a plurality of circumferentially disposed roots 518 and crest 520.

The novel set screw 500 of the present invention differs from the prior art knurled counterbored cup-point set screw 300 in that the portion 522 of the outer frustoconical surface of the set screw which is adjacent the edge 514 is smooth, rather than knurled. Preferably, the knurling 516 is proportioned such that the roots 518 of the knurling are extended smoothly from the surface portion 522 of the point 504 while the crests 520 extend radially outwardly from the cone defined by the surface portion 522.

Furthermore, in the preferred embodiment, the circular edge 514 defines a first plane 524 disposed parallel to and spaced from a second plane 526 defined by the lower most edges of the crests 520 of the knurling 516. A third plane 528 is defined by the region of the cavity 506 where the inner cylindrical surface 514 ends. In the preferred embodiment, the second and third planes are approximately coplanar. However, depending on the nature of the workpiece and the type of vibration experienced, it may be desirable for the second plane or the third plane to be further from the first plane.

As shown in FIG. 7, when the set screw 500 of the present invention is tightened against the work 530, the circular edge 514 engages the surface of the work and the leading portion of the annular wedge 508 penetrates smoothly into the work without the reaming action of knurling. After the wedge 508 has penetrated a predetermined distance, the knurl crests 520 engage the work and offer the additional point gripping power described earlier to add to the frictional resistance to the undesirable loosening of the set screw 500.

It will be appreciated by those skilled in the art that the above described set screw 500 provides improved resistance to loosening over prior art set screws since screw 500 presents the work with both a counterbored plain cup-point and a knurled surface to resist loosening.

The above comprises a detailed description of the best mode contemplated by the inventor at the time of filing for carrying out the present invention and is offered by way of example and not by way of limitation. It will be appreciated by those skilled in the art that many modifications and variations may be made to the present invention without departing from the spirit thereof. Such variations and modifications are included within the intended scope of the claims appended hereto.

What is claimed as novel is as follows:

1. A set screw comprising:
   a shank having a longitudinal axis and having exterior threads along most of its length, said shank further comprising:
   a frustoconical portion formed with and defining one end of said shank, said frustoconical portion having the same longitudinal axis as said shank and a larger diameter equal to the diameter of, and coterminous with, the threaded portion of said shank;
   a cavity formed within said frustoconical portion in the end of said shank, said cavity being defined by a first portion immediately interior to the outermost portion of said frustoconical portion and comprising a generally cylindrical wall concentric with the longitudinal axis of said shank,
   said cavity cooperating with said frustoconical portion to define therebetween an annular wedge concentric with the longitudinal axis of said shank and terminating in a circular edge, said circular edge defining a plane normal to the longitudinal axis of said shank; and
   circumferential knurling, in the form of a plurality of teeth comprising circumferentially alternating spaced crests and roots, said teeth being on the outer surface of said frustoconical point and extending from that portion of the outer surface of said frustoconical portion furthest from the circular edge, towards, but not extending to, said circular edge.

2. The set screw of claim 1 wherein said cavity formed in said shank extends inwardly of said shank beyond said frustoconical portion.

3. The set screw of claim 1 wherein said cavity is further defined by a second portion interior to said cylindrical first portion, said second portion being concentric with the longitudinal axis of said shank and generally conical in shape, having its largest diameter equal to and coterminous with the innermost perifery of the cylindrical first portion.

4. The set screw of claim 3 wherein said cavity formed in said shank extends inwardly of said shank beyond said frustoconical portion.

5. The set screw of claim 1, wherein said cavity is further defined by a second portion interior to said cylindrical first portion, said second portion being concentric with the longitudinal axis of said shank and generally cup-shaped, having its largest diameter equal to and coterminous with the innermost perifery of the cylindrical first portion.

6. The set screw of claim 5 wherein said cavity formed in said shank extends inwardly of said shank beyond said frustoconical portion.

* * * * *